(12) United States Patent
Sassman

(10) Patent No.: US 9,295,326 B2
(45) Date of Patent: Mar. 29, 2016

(54) GUITAR STORAGE AND DISPLAY RACK

(71) Applicant: Jeff Sassman, Garden Grove, CA (US)

(72) Inventor: Jeff Sassman, Garden Grove, CA (US)

(*) Notice: Subject to any disclaimer, the term of this patent is extended or adjusted under 35 U.S.C. 154(b) by 0 days.

(21) Appl. No.: 14/834,109

(22) Filed: Aug. 24, 2015

(65) Prior Publication Data

US 2016/0051046 A1    Feb. 25, 2016

Related U.S. Application Data

(60) Provisional application No. 62/041,253, filed on Aug. 25, 2014.

(51) Int. Cl.
| *A47B 81/00* | (2006.01) |
| *A47B 95/00* | (2006.01) |
| *F16B 11/00* | (2006.01) |
| *G10G 5/00*  | (2006.01) |

(52) U.S. Cl.
CPC ............... *A47B 81/00* (2013.01); *A47B 95/008* (2013.01); *F16B 11/006* (2013.01); *G10G 5/00* (2013.01)

(58) Field of Classification Search
CPC ......... A47B 81/005; A47B 81/00; G10G 5/00
USPC ............... 211/85.6, 85.7, 89.01, 94.01
See application file for complete search history.

(56) References Cited

U.S. PATENT DOCUMENTS

| 2,058,184 | A | * | 10/1936 | Sherrard | G10G 5/00 211/20 |
| 2,371,433 | A | * | 3/1945 | Davis | B25H 3/04 211/162 |
| 2,740,530 | A | * | 4/1956 | Ponder | F41A 23/18 206/317 |
| 2,855,108 | A | * | 10/1958 | Haapala | A47B 81/005 211/64 |
| 4,209,098 | A | * | 6/1980 | Adams | A47F 5/0853 211/70.8 |
| 4,566,597 | A | * | 1/1986 | Caputo | A47K 1/09 108/152 |
| 4,763,797 | A | * | 8/1988 | Egan | A63C 11/028 211/70.5 |
| 4,771,897 | A | * | 9/1988 | Ho | A47G 29/10 211/85.9 |
| 4,781,608 | A | * | 11/1988 | Hillmann | B60M 1/34 211/94.01 |
| 4,852,747 | A | * | 8/1989 | Breveglieri | A47L 13/512 211/60.1 |
| 5,165,629 | A | * | 11/1992 | Breveglieri | B25H 3/04 211/60.1 |
| 5,259,519 | A | * | 11/1993 | Lieberman | A47F 5/0853 211/66 |
| 5,727,697 | A | * | 3/1998 | Ricciardelli | A47F 7/0028 211/89.01 |
| 6,152,312 | A | * | 11/2000 | Nava | A47B 61/003 211/94.01 |
| 6,179,135 | B1 | * | 1/2001 | Simpson | G10G 5/00 211/85.6 |

(Continued)

FOREIGN PATENT DOCUMENTS

DE    4106351 A1 *    9/1992    ............ A47B 81/00

*Primary Examiner* — Stanton L Krycinski

(57) ABSTRACT

A storage and display rack for various guitar types that also allows a user to easily add and remove said guitars. The rack includes a backboard, a first cleat, a second cleat, a wall mounting mechanism, an elongated gap, a locking mechanism, and a stop. The backboard acts as the support structure and includes a front surface and a rear surface. The first cleat and the second cleat are adjacently connected to the front surface, parallel and offset from each other. The first cleat, the second cleat, and the front surface delineate an elongated gap that is designed to receive guitar hangers. The wall mounting mechanism is attached to the rear surface and fastens the backboard to a wall surface. The locking mechanism and the stop contain the guitar hangers within the elongated gap and are positioned within the elongated gap, opposite to each other along the elongated gap.

6 Claims, 12 Drawing Sheets

(56) References Cited

U.S. PATENT DOCUMENTS

| | | | | |
|---|---|---|---|---|
| 6,281,417 B1 * | 8/2001 | Ladao | G10G 5/00 | 211/85.6 |
| 6,296,213 B1 * | 10/2001 | Law, III | G10G 5/00 | 206/45.2 |
| 6,435,357 B1 * | 8/2002 | Lee | A47F 5/0838 | 211/70.6 |
| 6,564,949 B1 * | 5/2003 | Saathoff | B25H 3/006 | 211/70.6 |
| 6,626,402 B1 * | 9/2003 | Kaminstein | A46B 17/02 | 211/70.6 |
| 6,698,603 B2 * | 3/2004 | Lawson | A47F 5/0846 | 211/94.01 |
| 7,014,052 B2 * | 3/2006 | Dettorre | A47F 5/0838 | 211/18 |
| 7,028,854 B1 * | 4/2006 | Londrico | A47B 65/00 | 211/120 |
| 7,669,723 B2 * | 3/2010 | Kao | B25H 3/04 | 206/349 |
| 7,717,278 B2 * | 5/2010 | Kao | B25H 3/04 | 206/349 |
| 8,069,995 B2 * | 12/2011 | Winnard | B25H 3/003 | 211/70.6 |
| 2004/0020883 A1 * | 2/2004 | Brokaw | A47F 7/0028 | 211/89.01 |
| 2004/0099624 A1 * | 5/2004 | Hein | A47L 13/512 | 211/89.01 |
| 2006/0234846 A1 * | 10/2006 | Tucker | B25H 3/04 | 483/26 |
| 2008/0006592 A1 * | 1/2008 | Brooks | B25H 3/04 | 211/89.01 |

* cited by examiner

Section A-A

GUITAR STORAGE AND DISPLAY RACK

The current application claims a priority to the U.S. Provisional Patent application Ser. No. 62/041,253 filed on Aug. 25, 2014.

FIELD OF THE INVENTION

The present invention relates generally to guitar storage and display systems. More specifically, the present invention is a rack designed to conveniently store guitars of various shapes and sizes as well as display said guitars in an aesthetically pleasing manner.

BACKGROUND OF THE INVENTION

The guitar is an extremely versatile instrument and may be found in many musical styles including classical, flamenco, blues, jazz, pop, rock, metal, and blues. Each musical style alters the design of the guitar to suit its specific acoustic needs, resulting in variety of guitars. For example, electric guitars have a narrow, solid, and skinny body as they do not require a soundboard. Additional variations include wide archtops, unusual geometries, shortened necks, additional strings, and even double-neck designs. Guitars are objects of entertainment, tools for working musicians, pieces of art, and many times valuable collector's items. With such a unique design, the guitar requires specific storage and display needs so as to preserve its acoustic quality while also highlighting its aesthetic features. The most effective storage and display means available on the market is a wall-mounted rack. While many wall-mounted guitar storage and display systems already exist, most are designed specifically for only one or two guitar types. Those intended for multiple types of guitars are often limited to the type of guitars and have fixed spacing in between the holding devices and thus requiring large amount of space for installment. Additionally, some systems are designed for a specific fixed number of guitars, making it inconvenient to add guitars. It is therefore an objective of the present invention to introduce a wall-mounted guitar storage system that safely holds and displays a plurality of guitars of various shapes and sizes. Additionally, the present invention allows for convenient addition or removal of guitars.

DETAIL DESCRIPTIONS OF THE INVENTION

All illustrations of the drawings are for the purpose of describing selected versions of the present invention and are not intended to limit the scope of the present invention.

The present invention relates to guitar accessories. In particular, the present invention is a wall-mounted storage and display rack for guitars. The present invention is compatible with a multitude of guitar types, shapes, and sizes. Through a railing-type design, the present invention allows for easy and convenient addition and removal of guitars.

Figure 1:
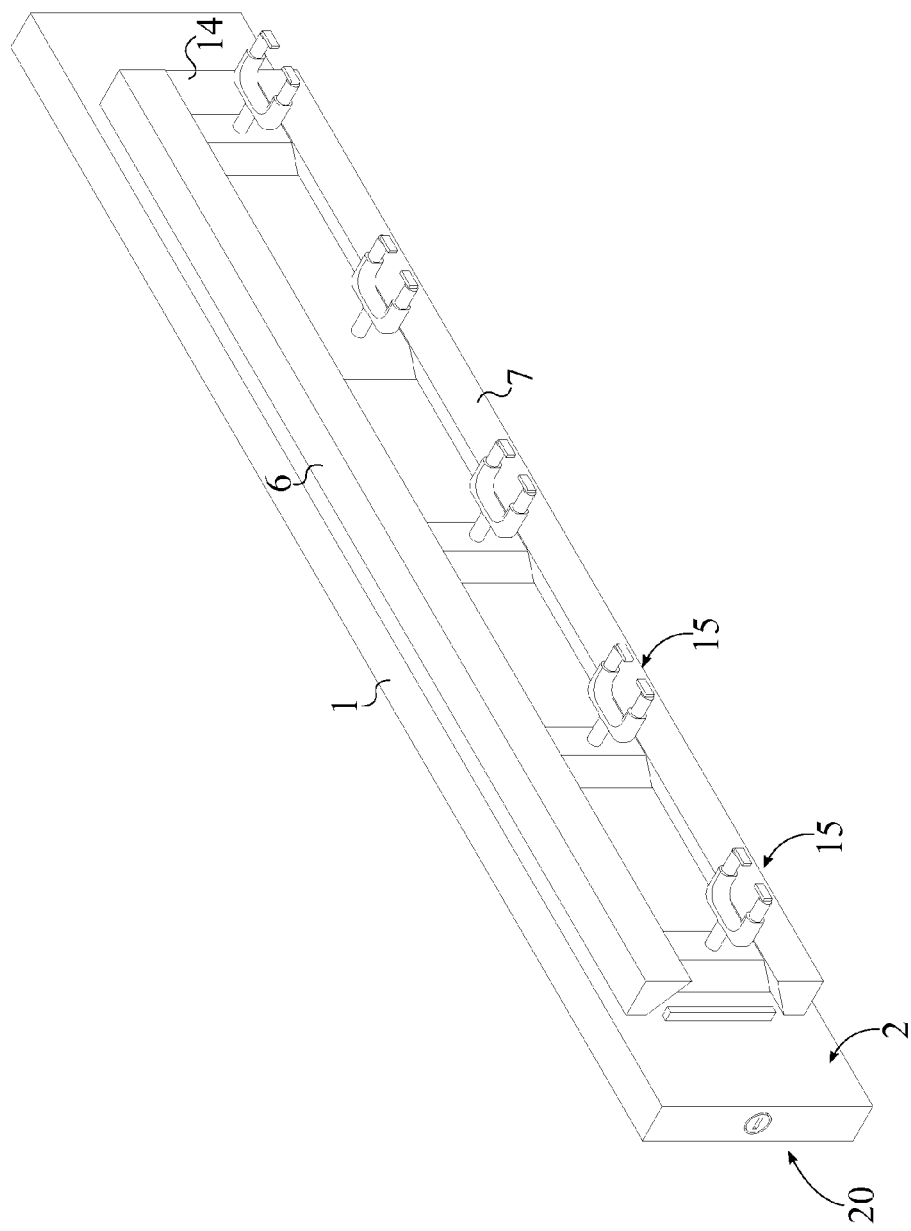
FIG. 1 is a front perspective view of the present invention.
Figure 2:
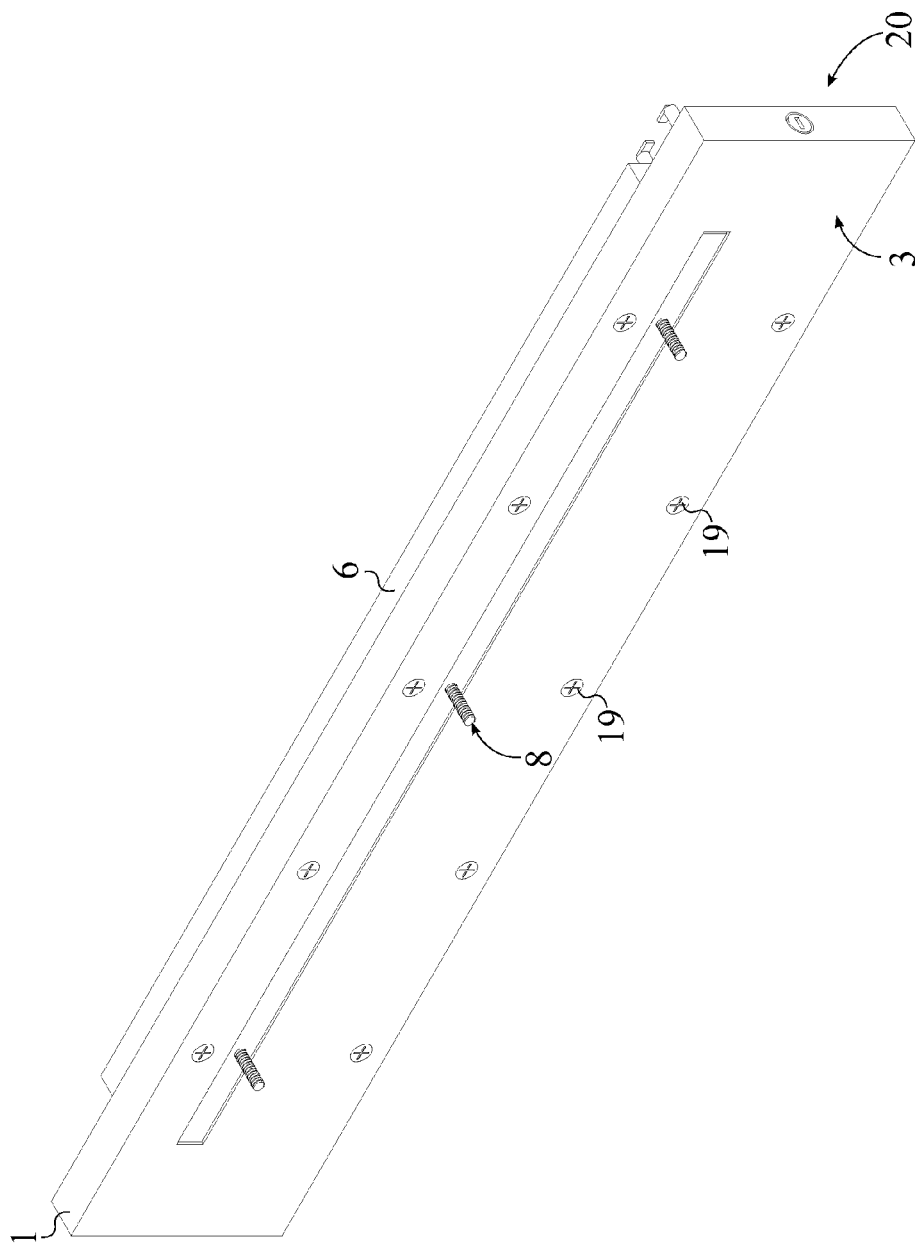
FIG. 2 is a rear perspective view of the present invention.
Figure 3:
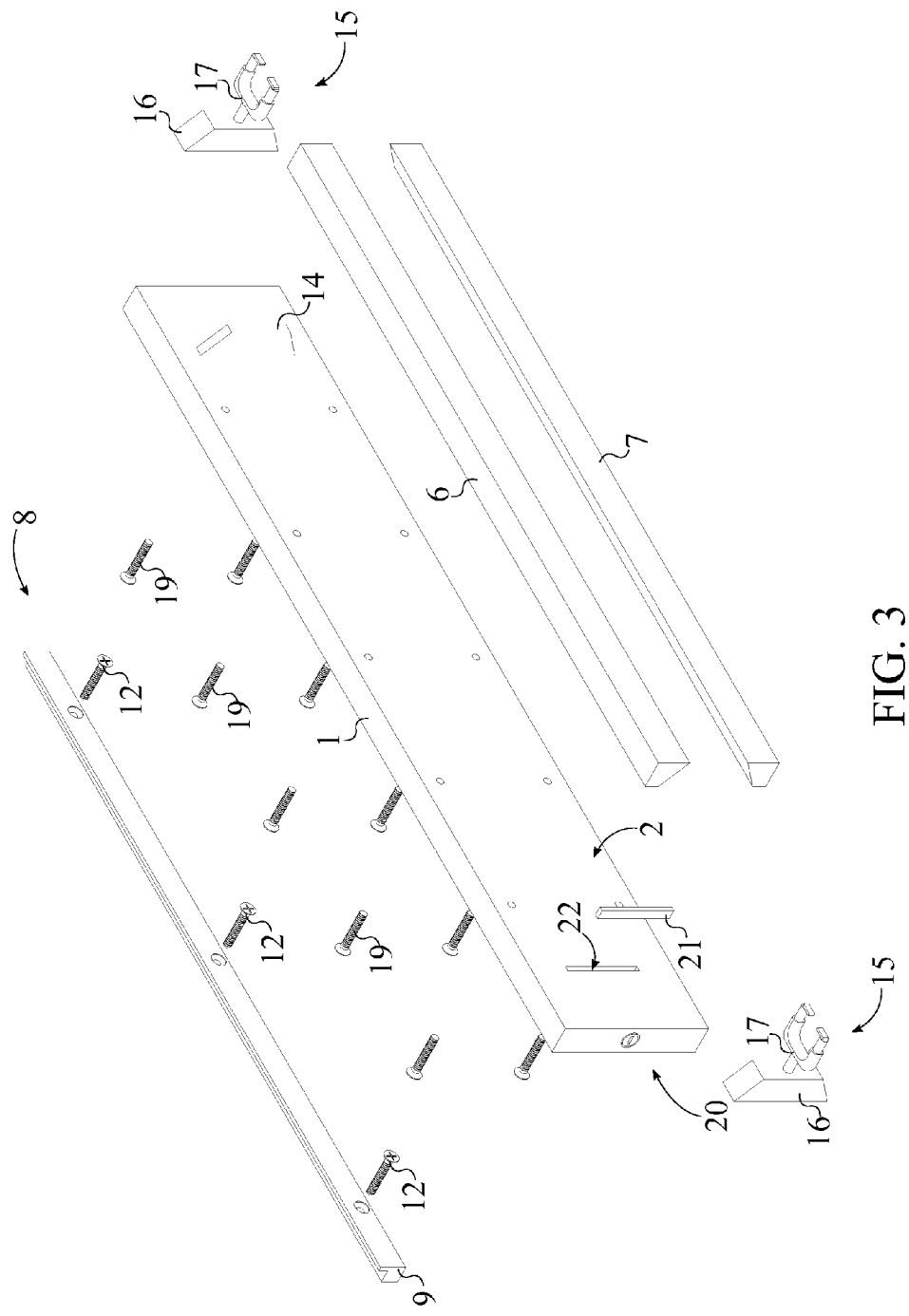
FIG. 3 is an exploded front perspective view of the present invention.
Figure 6:
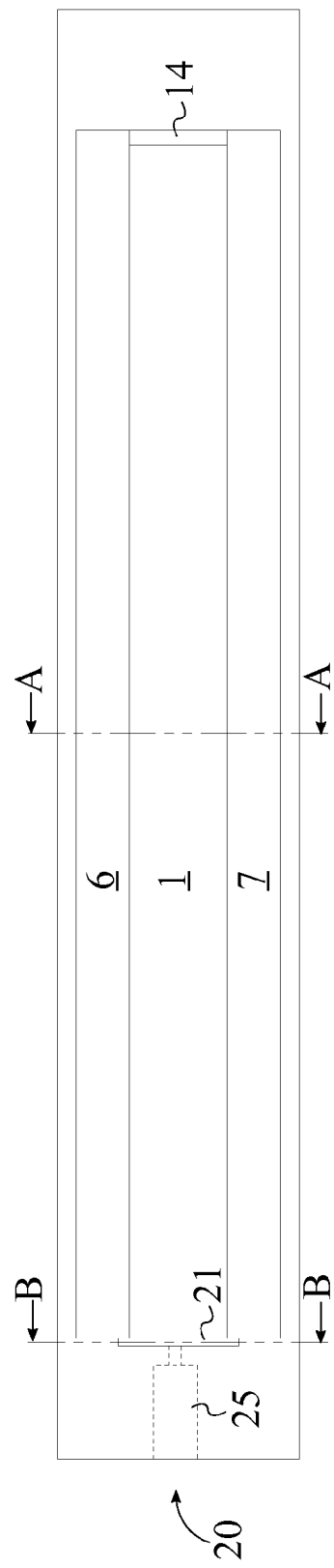
FIG. 6 is a front view of the present invention.

Referring to FIG. 1-FIG. 3, the present invention comprises a backboard 1, a wall mounting mechanism 8, a first cleat 6, a second cleat 7, an elongated gap 13, a locking mechanism 20, and a stop 14. The backboard 1 is the portion of the present invention that is mounted/attached to a wall surface. The backboard 1 comprises a front surface 2 and a rear surface 3. The backboard 1 is mounted/attached to the wall surface by the wall mounting mechanism 8 and, as such, the wall mounting mechanism 8 is attached onto the rear surface 3. The first cleat 6 and the second cleat 7 act as rails to hold a plurality of guitar hangers 15 and are adjacently connected onto the front surface 2, along the backboard 1. The first cleat 6 and the second cleat 7 are oriented parallel to each other and are positioned opposite to each other across the front surface 2 as seen in FIG. 6. The positioning of the first cleat 6 and the second cleat 7 creates a space, the elongated gap 13, which receives the plurality of guitar hangers 15. More specifically, the elongated gap 13 is delineated between the first cleat 6, the second cleat 7, and the front surface 2. The locking mechanism 20 and the stop 14 prevent the plurality of guitar hangers 15 from sliding out of the elongated gap 13 and disengaging from the first cleat 6 and the second cleat 7. The locking mechanism 20 and the stop 14 are integrated into the front surface 2 as seen in FIG. 3. The locking mechanism 20 and the stop 14 are positioned within the elongated gap 13 and are opposite to each other along the elongated gap 13. The stop 14 permanently blocks one end of the elongated gap 13 while the locking mechanism 20 blocks the opposing end of the elongated gap 13. The locking mechanism 20 may be disengaged in order to add or remove a guitar hanger from the plurality of guitar hangers 15.

Figure 7:
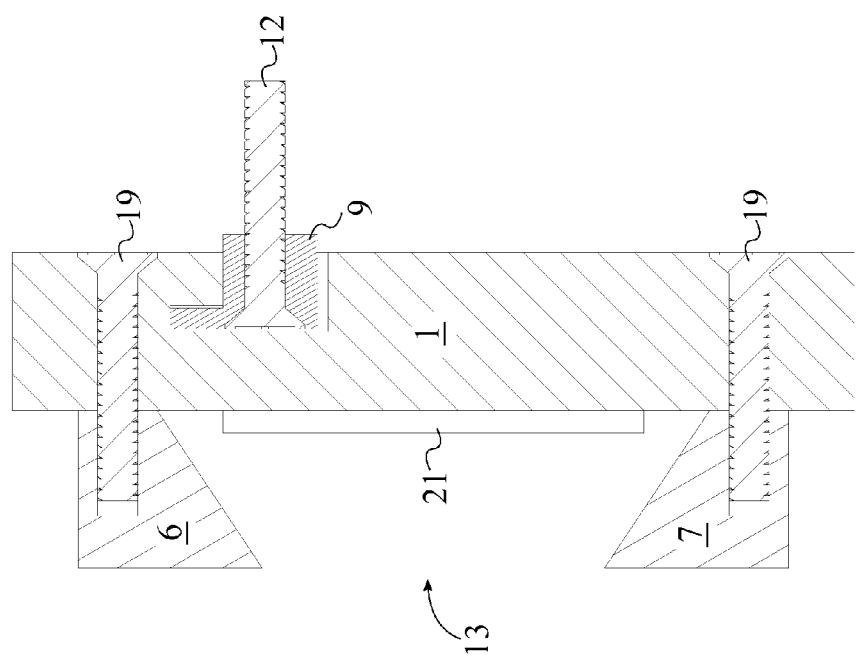
FIG. 7 is a section view taken along the line A-A shown in FIG. 6.

The first cleat 6 and the second cleat 7 provide the vertical and lateral support to the plurality of guitar hangers 15. The preferred cross-section of the first cleat 6 and the second cleat 7 is of a quadrilateral geometry as seen in FIG. 7. Additionally, the first cleat 6 and the second cleat 7 are oriented towards each other such that the vertical distance in between the first cleat 6 and the second cleat 7 decreases as seen in FIG. 7. The first cleat 6 and the second cleat 7 are adjacently connected to the front surface 2 by a plurality of cleat fasteners 19; various alternative types of fasteners may be used for the plurality of cleat fasteners 19 including, but not limited to, screws, bolts, and studs. The length, width, shape, and material composition of the first cleat 6 and the second cleat 7 may also vary depending specific applications. For example, a metal-based composition may be used to increase the load capacity of the present invention as well as increase structural durability and reliability.

Referring to FIG. 3, each of the plurality of guitar hangers 15 comprises an engagement base 16 and a U-shaped yoke 17. The engagement base 16 in conjunction with the first cleat 6 and the second cleat 7 is the means by which each of the guitar hangers is attached to the backboard 1. The engagement base 16 is slidably positioned in between the first cleat 6 and the second cleat 7, adjacent to the front surface 2. More specifically, the engagement base 16 is positioned within the elongated gap 13. A cross-section of the engagement base 16 is shaped complimentary to a cross-section of the elongated gap 13 such that the engagement base 16 touches the front surface 2, the first cleat 6, and the second cleat 7. The preferred cross-section of the engagement base 16 is an isosceles trapezoid. This design allows the engagement base 16 to slide along the length of the backboard 1, the first cleat 6, and the second cleat 7 to be positioned according to the user's preference. Furthermore, this design allows the user to easily add or remove guitar hangers. The U-shaped yoke 17 is connected adjacent to the engagement base 16, opposite to the front face. The U-shaped yoke 17 comprises two symmetrical prongs. The prongs are used to securely and safely hold a guitar. More specifically, the U-shaped yoke 17 is sized and shaped to receive the neck portion of the guitar but not the head portion. This allows the U-shaped yoke 17 to vertically support the guitar by the neck portion of the guitar. As seen in FIG. 3, the plurality of guitar hangers 15 is distributed along the elongated gap 13 thus allowing for the storage and display of a multitude of guitars simultaneously. The prongs of the U-shaped yoke 17 may be composed of a soft rubber-like material in order to prevent damage to the guitar. The present invention may altered and configured to be compatible with alternative types of guitar hangers.

Figure 9:
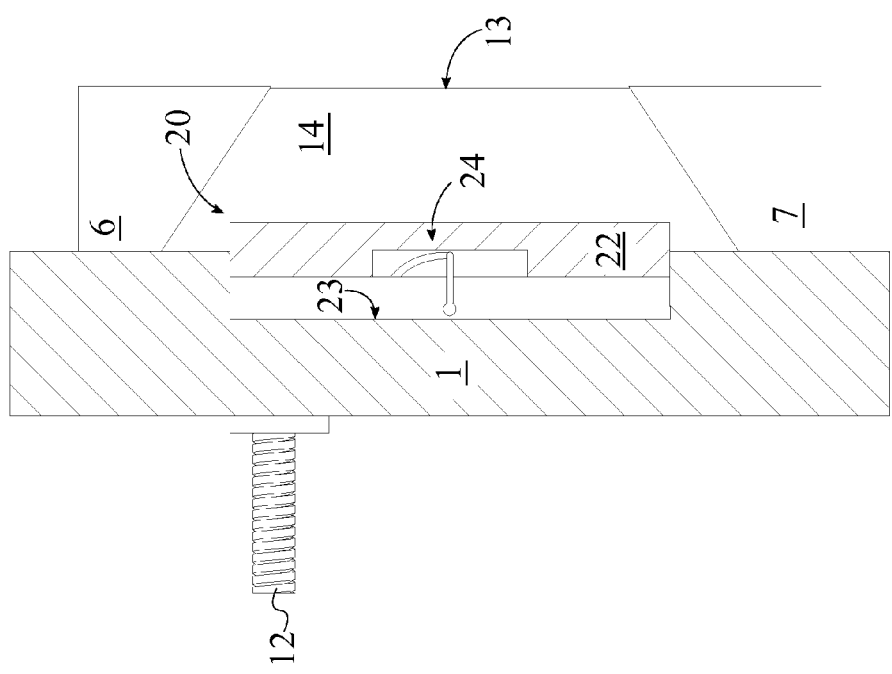
FIG. 9 is a section view taken along the line B-B shown in FIG. 6.
Figure 10:
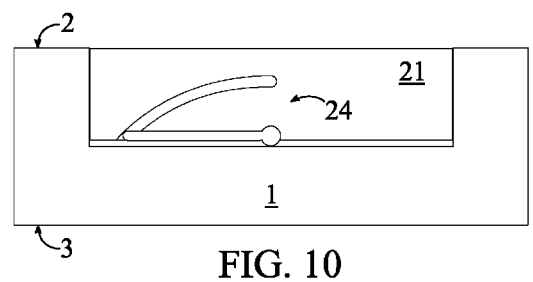
FIG. 10 is a schematic view of the locking mechanism in a retracted configuration.
Figure 11:
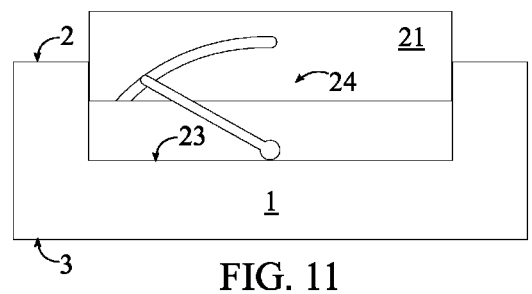
FIG. 11 is a schematic view of the locking mechanism in between the retracted configuration and an extended configuration.
Figure 12:
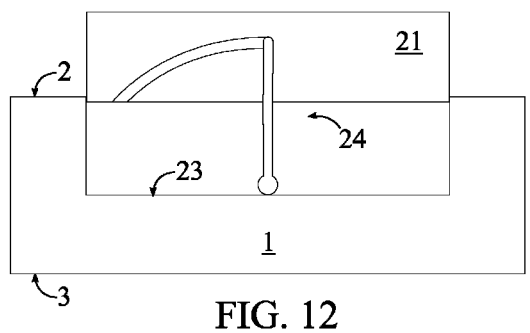
FIG. 12 is a schematic view of the locking mechanism in the extended configuration.

The stop 14 in conjunction with the locking mechanism 20 enclose both ends of the elongated gap 13 and contain the plurality of guitar hangers 15 within the elongated gap 13. Referring to FIG. 3 and FIG. 9, the locking mechanism 20 comprises a barrier 21, a slot 22, and a mechanical lift 24. The slot 22 traverses normal into the backboard 1 from the front surface 2 and is shaped and sized to receive the barrier 21. The barrier 21 physically blocks the open end of the elongated gap 13 and is slidably positioned within the slot 22. The barrier 21 is preferably a rectangular extrusion shaped and sized to fit within the slot 22. The mechanical lift 24 raises and lowers the barrier 21 in relation to the slot 22 and, as such, is positioned in between a base 23 of the slot 22 and the barrier 21. Various types of devices may be used for the mechanical lift 24 including, but not limited to, mechanical linkages, cam-based actuators, and other similar mechanisms. For example, the mechanical lift may comprise a mechanical linkage which uses a track to convert rotational motion from an actuation interface 25 into linear motion in order to position the barrier 21 into an extended configuration or a retracted configuration, as seen in FIG. 9-FIG. 12. The actuation interface 25 of the mechanical lift 24 allows the user to activate the mechanical lift 24. The actuation interface 25 traverses out of the backboard 1 in between the front surface 2 and the rear surface 3, preferably perpendicular to the length of the backboard 1; this positions the actuating interface 25 on the surface adjacent to the first cleat 6 or the second cleat 7, allowing for multiple instances of the present invention to be lined up sequentially next to each other and the user still being able to access the actuation interface 25. The preferred actuation interface 25 is a tumbler lock, although alternative devices may also be used. With a tumbler lock, access to the plurality of guitar hangers 15 and the guitars may be controlled, a useful feature for retail applications. In one embodiment of the present invention, the stop 14 is replaced with another instance of the locking mechanism 20, allowing for the user to remove guitars from either side of the apparatus. For retail application or secure storage purposes, the present invention may be used in conjunction with a grip system lock for each of the plurality of guitar hangers 15 to lock the guitars within their respective guitar hangers. The grip system lock latches on to the prongs of the U-shaped yoke 17 and may only be removed by a key, thus securing the guitar to the respective guitar hanger from the plurality of guitar hangers 15. By using the grip system lock in conjunction with the locking mechanism 20, guitars stored by the present invention may not be removed without authoritative permission.

Figure 4:
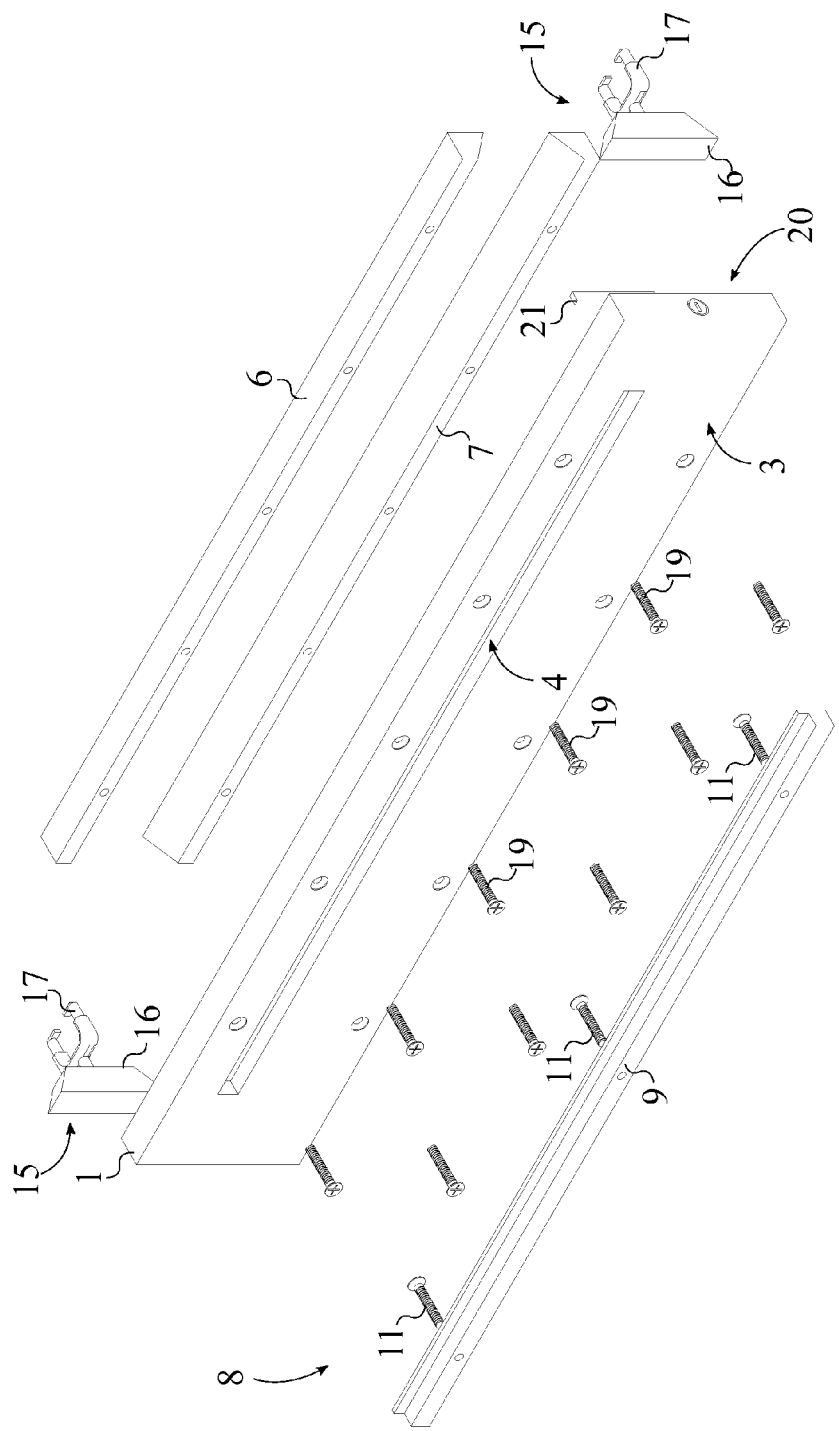
FIG. 4 is an exploded front perspective view of the present invention.
Figure 5:
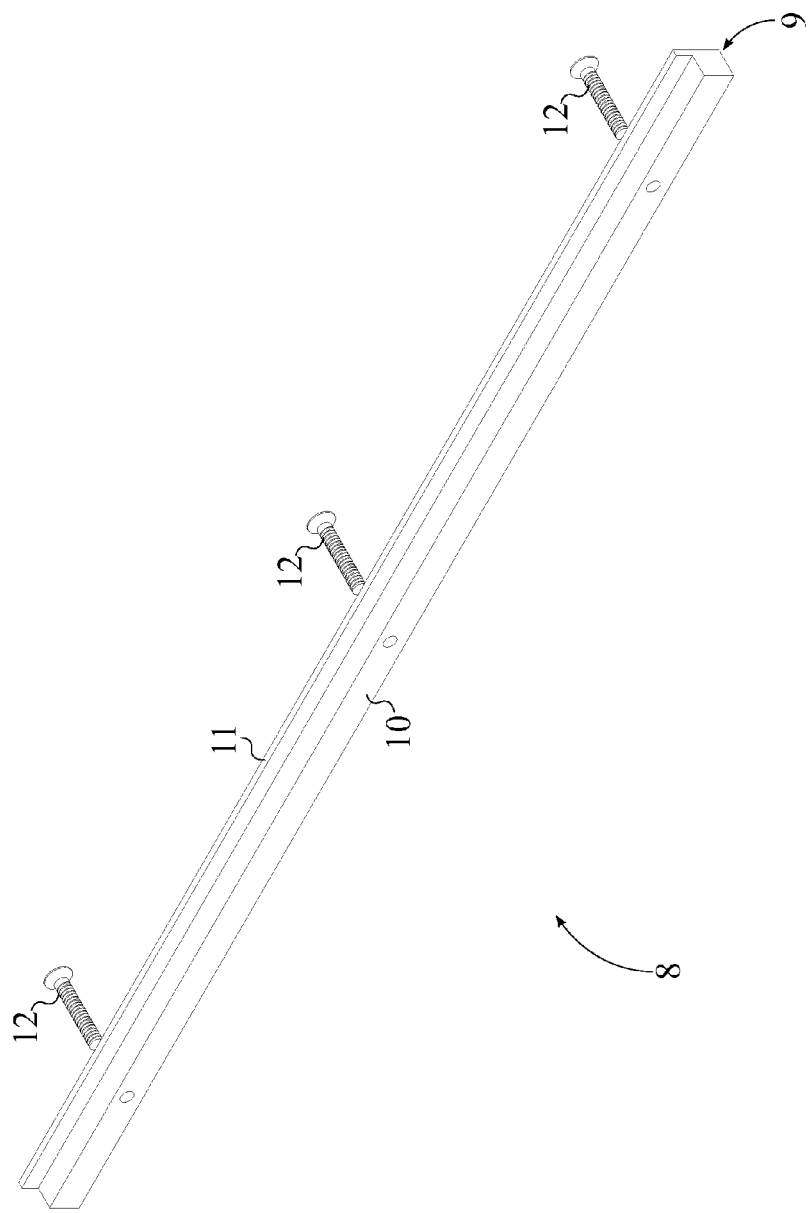
FIG. 5 is a perspective view of the wall mounting mechanism.
Figure 8:
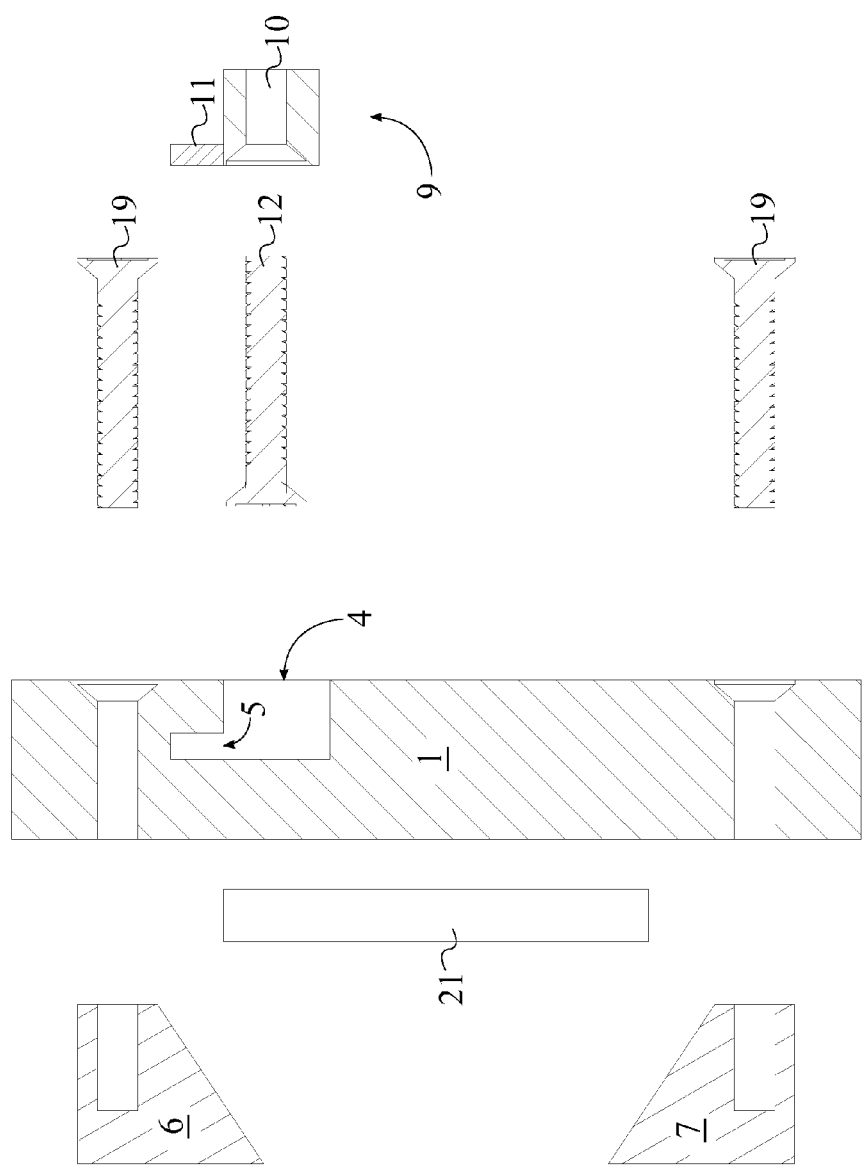
FIG. 8 is an exploded state of the sectional view shown in FIG. 7.

The wall mounting mechanism 8 securely attaches the present invention to a wall surface. The preferred wall mounting mechanism 8 comprises a mounting bracket 9 and a plurality of studs 12 as seen in FIG. 5. The mounting bracket 9 is a means of removably attaching the backboard 1 to the wall surface. The mounting bracket 9 comprises a main elongated body 10 and an engagement lip 11. The main elongated body 10 provides vertical support for the backboard 1 and is preferably a rectangular extrusion with a length equal to or less than the length of the backboard 1. The engagement lip 11 provides lateral support and prevents the backboard 1 from sliding laterally away from the wall surface and thus off the mounting bracket 9. The engagement lip 11 is positioned along the main elongated body 10 and adjacently connected to the main elongated body 10. Complimentary to the wall mounting mechanism 8, the backboard 1 further comprises a body-receiving slot 4 and a lip-receiving cavity 5 as seen in FIG. 8. The body-receiving slot 4 traverses normal into the backboard 1 from the rear surface 3. The body-receiving slot 4 receives the main elongated body 10 and as such is sized complimentary to the main elongated body 10. The lip-receiving cavity 5 traverses into the backboard 1 from the body-receiving slot 4, parallel to the rear surface 3; the lip-receiving cavity 5 receives the engagement lip 11 and as such is sized complimentary to the engagement lip 11 as seen in FIG. 7. Referring to FIG. 4, the plurality of studs 12 fastens the mounting bracket 9 to the wall surface and is connected along the main elongated body 10, adjacent to the rear surface 3. To attach the backboard 1 to the mounting bracket 9, the user simply positions the engagement lip 11 within the lip-receiving cavity 5 and the main elongated body 10 within the body-receiving slot 4.

Figure 13:
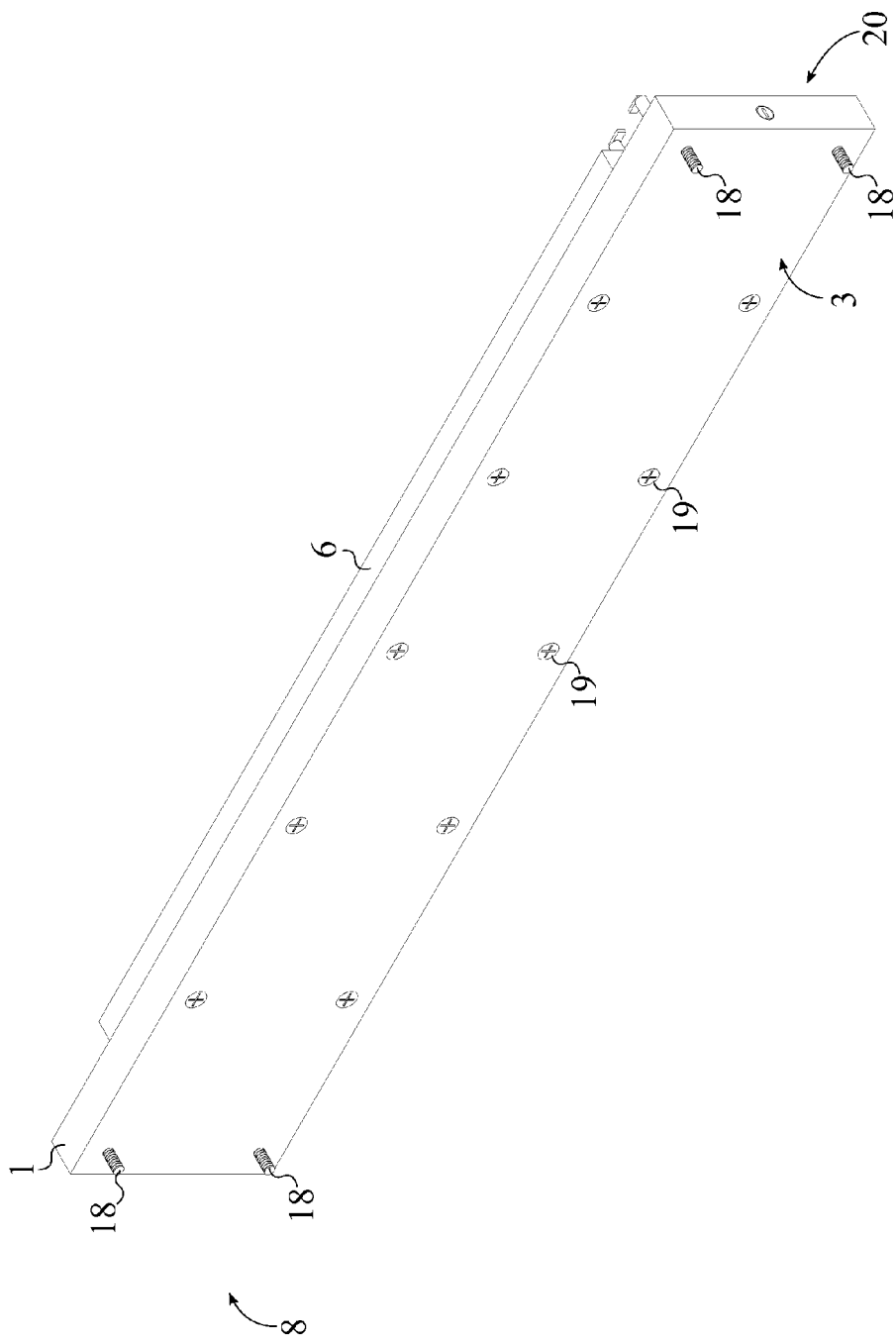
FIG. 13 is a rear perspective view of the present invention depicting a plurality of wall fasteners as the mounting mechanism.
Figure 14:
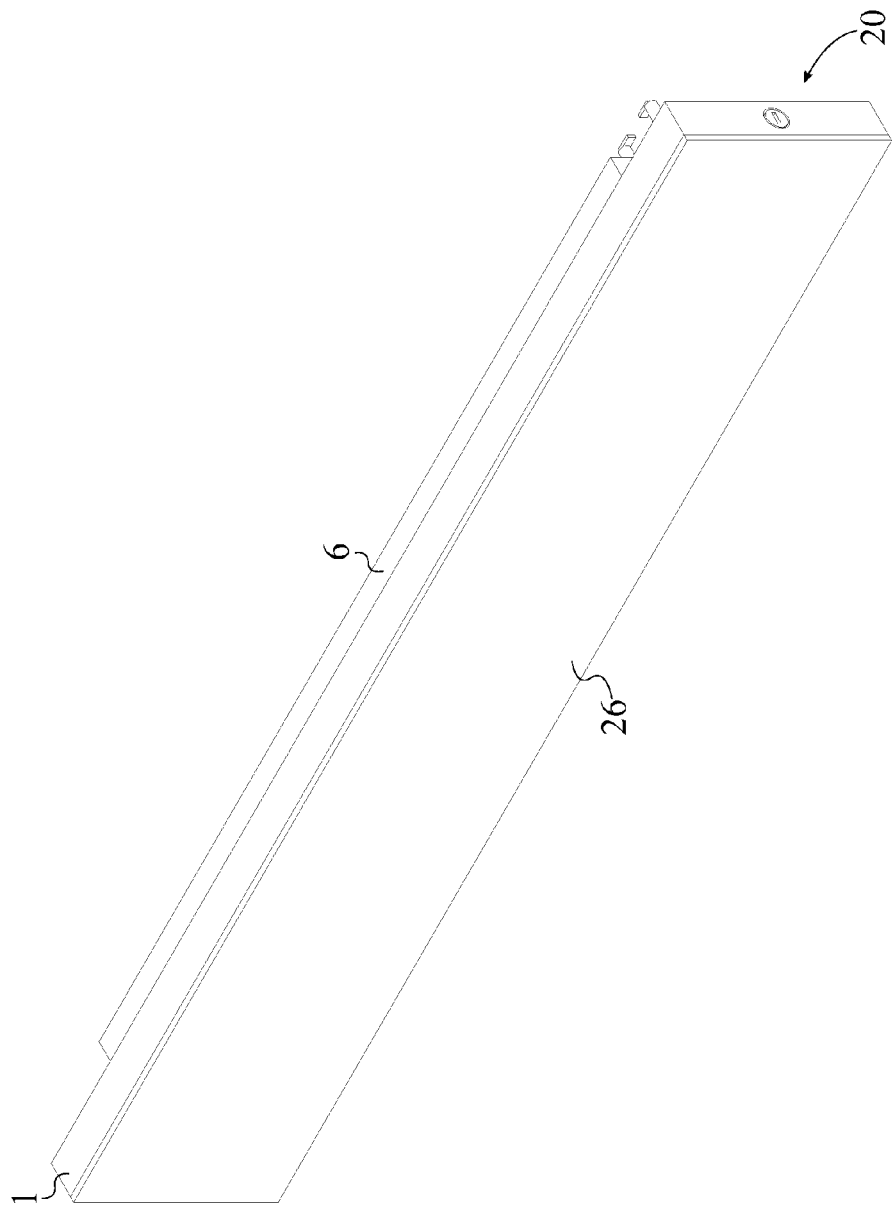
FIG. 14 is a rear perspective view of the present invention depicting an adhesive layer as the mounting mechanism.

In other embodiments of the present invention, alternative methods and mechanisms may be used as the wall mounting mechanism 8. In one embodiment, the wall mounting mechanism 8 is plurality of wall fasteners 18 that is distributed throughout the backboard 1 and are drilled/attached to the wall surface as seen in FIG. 13. In yet another embodiment, the wall mounting mechanism 8 is an adhesive layer 26 that adheres the rear surface 3 and the wall surface as seen in FIG. 14.

Although the invention has been explained in relation to its preferred embodiment, it is to be understood that many other possible modifications and variations can be made without departing from the spirit and scope of the invention as hereinafter claimed.

What is claimed is:

1. A guitar storage and display rack comprises:
a backboard;
a first cleat;
a second cleat;
a wall mounting mechanism;
a locking mechanism;
an elongated gap;
a stop;

the backboard comprises a front surface and a rear surface;
the first cleat and the second cleat being adjacently connected onto the front surface, along the backboard;
the first cleat and the second cleat being oriented parallel to each other;
the first cleat and the second cleat being positioned opposite to each other across the front surface;
the wall mounting mechanism being attached onto the rear surface;
the elongated gap being delineated between the first cleat, the second cleat, and the front surface;
the locking mechanism and the stop being positioned within the elongated gap;
the locking mechanism and the stop being positioned opposite to each other along the elongated gap;
the locking mechanism and the stop being integrated onto the front surface;
the locking mechanism comprises a barrier, a slot, and a mechanical lift;
the slot traversing normal into the backboard from the front surface;
the barrier being slidably positioned within the slot;
the mechanical lift being positioned in between a base of the slot and the barrier; and
an actuation interface of the mechanical lift traversing out of the backboard in between the front surface and the rear surface.

2. The guitar storage and display rack as claimed in claim 1 comprises:
a plurality of guitar hangers;
each of the guitar hangers comprises an engagement base and a U-shaped yoke;
the engagement base being positioned adjacent to the front surface within the elongated gap;
the engagement base being slidably positioned in between the first cleat and the second cleat;
the U-shaped yoke being connected adjacent to the engagement base, opposite to the front surface; and
the plurality of guitar hangers being distributed along the elongated gap.

3. The guitar storage and display rack as claimed in claim 1, wherein the wall mounting mechanism is a plurality of wall fasteners.

4. The guitar storage and display rack as claimed in claim 1 comprises:
the backboard further comprises a body-receiving slot and a lip-receiving cavity;
the wall mounting mechanism comprises a mounting bracket and a plurality of studs;
the mounting bracket comprises a main elongated body and an engagement lip;
the body-receiving slot traversing normal into the backboard from the rear surface;
the lip-receiving cavity traversing into the backboard from the body-receiving slot parallel to the rear surface;
the engagement lip being positioned along the main elongated body;
the engagement lip being adjacently connected to the main elongated body;
the engagement lip being positioned within the lip-receiving cavity;
the main elongated body being positioned within the body-receptive slot; and
the plurality of studs being connected along the main elongated body, adjacent to the rear surface.

5. The guitar storage and display rack as claimed in claim 1, wherein the first cleat and the second cleat are adjacently connected to the front surface by a plurality of cleat fasteners.

6. The guitar storage and display rack as claimed in claim 1, wherein the wall mounting mechanism is an adhesive layer.

* * * * *